US010358730B2

(12) United States Patent
Tarutani et al.

(10) Patent No.: US 10,358,730 B2
(45) Date of Patent: Jul. 23, 2019

(54) ADDITIVE FOR HIGH-PURITY COPPER ELECTROLYTIC REFINING AND METHOD OF PRODUCING HIGH-PURITY COPPER

(71) Applicant: MITSUBISHI MATERIALS CORPORATION, Tokyo (JP)

(72) Inventors: Yoshie Tarutani, Naka (JP); Kenji Kubota, Naka (JP); Kiyotaka Nakaya, Naka (JP)

(73) Assignee: MITSUBISHI MATERIALS CORPORATION, Tokyo (JP)

( * ) Notice: Subject to any disclaimer, the term of this patent is extended or adjusted under 35 U.S.C. 154(b) by 310 days.

(21) Appl. No.: 15/509,495

(22) PCT Filed: Oct. 2, 2015

(86) PCT No.: PCT/JP2015/078047
§ 371 (c)(1),
(2) Date: Mar. 8, 2017

(87) PCT Pub. No.: WO2016/052725
PCT Pub. Date: Apr. 7, 2016

(65) Prior Publication Data
US 2017/0283966 A1 Oct. 5, 2017

(30) Foreign Application Priority Data

Oct. 4, 2014 (JP) ................................. 2014-205310
Aug. 29, 2015 (JP) ................................. 2015-169882

(51) Int. Cl.
*C25C 1/12* (2006.01)
*C08G 65/329* (2006.01)

(52) U.S. Cl.
CPC .............. *C25C 1/12* (2013.01); *C08G 65/329* (2013.01)

(58) Field of Classification Search
CPC .............................. C25C 1/12; C08G 65/329
See application file for complete search history.

(56) References Cited

U.S. PATENT DOCUMENTS

2008/0264799 A1   10/2008   Seelmann-Eggebert et al.

FOREIGN PATENT DOCUMENTS

| CN | 101120119 A | 2/2008 |
| CN | 103388160 A | 11/2013 |
| CN | 103397349 A | 11/2013 |
| JP | 08-000990 A | 1/1996 |
| JP | 2001-123289 A | 5/2001 |
| JP | 2005-307343 | 11/2005 |
| JP | 2008-530367 A | 8/2008 |

OTHER PUBLICATIONS

Office Action dated May 18, 2018, issued for the Chinese patent application No. 201580050220.8 and a partial English translation of the Search Report.
International Search Report dated Oct. 27, 2015, issued for PCT/JP2015/078047 and English translation thereof.

*Primary Examiner* — Ciel P Thomas
(74) *Attorney, Agent, or Firm* — Locke Lord LLP

(57) ABSTRACT

The additive for high-purity copper electrolytic refining of the present invention is an additive which is added to a copper electrolyte in electrolytic refining for high-purity copper and is formed of a non-ionic surfactant that includes a hydrophobic group containing an aromatic ring and a hydrophilic group containing a polyoxyalkylene group, in which a dispersion term dD of the Hansen solubility parameters satisfies $10 \leq dD \leq 20$, a polarity term dP of the Hansen solubility parameters satisfies $6 \leq dP \leq 9$, and a hydrogen bonding term dH of the Hansen solubility parameters satisfies $9 \leq dH \leq 11$.

14 Claims, No Drawings

ADDITIVE FOR HIGH-PURITY COPPER ELECTROLYTIC REFINING AND METHOD OF PRODUCING HIGH-PURITY COPPER

CROSS REFERENCE TO RELATED APPLICATIONS

This application is related to co-pending application: "ADDITIVE FOR HIGH-PURITY COPPER ELECTROLYTIC REFINING AND METHOD OF PRODUCING HIGH-PURITY COPPER" filed even date herewith in the names of Kenji KUBOTA, Yoshie TARUTANI and Kiyotaka NAKAYA as a national phase entry of PCT/JP2015/078050, which application is assigned to the assignee of the present application and is incorporated by reference herein.

TECHNICAL FIELD

The present invention relates to an additive for high-purity copper electrolytic refining which is used for producing high-purity copper in which the concentration of impurities such as sulfur and silver is greatly reduced and a method of producing high-purity copper using the additive.

Priorities are claimed on Japanese Patent Application No. 2014-205310, filed on Oct. 4, 2014, and Japanese Patent Application No. 2015-169882, filed on Aug. 29, 2015, the contents of which are incorporated herein by reference.

BACKGROUND ART

As described in PTL 1, a method of performing electrolysis in two stages of performing electrolysis on a copper sulfate aqueous solution; and performing electrolysis again on a copper nitrate aqueous solution at a low current density of 100 $A/m^2$ or less by means of using copper deposited on a cathode as an anode, is known as a method of producing high-purity copper.

Further, as described in PTL 2, a method of producing electrolytic copper foil in which mechanical characteristics and adhesion to a cathode are improved by combining a polyoxyethylene-based surfactant such as polyethylene glycol (PEG) with a copper sulfate electrolyte that contains chlorine ions, glue, and an active sulfur component, is known. Further, as described in PTL 3, a method of producing high-purity electrolytic copper in which the surface of copper is smooth and the amount of impurities such as silver and sulfur is small by combining a smoothing agent such as polyvinyl alcohol (PVA) with a slime accelerator such as PEG, is known.

CITATION LIST

Patent Literature

[PTL 1] Japanese Examined Patent Application, Second Publication No. H08-990
[PTL 2] Japanese Unexamined Patent Application, First Publication No. 2001-123289
[PTL 3] Japanese Unexamined Patent Application, First Publication No. 2005-307343

SUMMARY OF INVENTION

Technical Problem

In the production method including two stages of performing electrolysis in a copper sulfate bath and electrolysis in a copper nitrate bath as that of PTL 1, there is a problem in that considerable time and efforts are taken in the electrolysis. Further, there is another problem in that the use of nitric acid causes a high environmental burden and a complicated waste water treatment.

When a conventional additive (PVA, PEG, or the like) is used, it is difficult to increase the current density. Further, when electrolyte is stirred to increase the current density, slime is blown up and adheres to a cathode so that the purity of electrolytic copper is degraded. In addition, since the additive strongly suppresses dissolution of an anode, the dissolution overvoltage of the anode is increased and a large amount of slime is generated at the time of dissolution of the anode. Therefore, the yield of the cathode is decreased and the amount of slime adhering to the cathode is increased. Moreover, since the conventional additive suppresses the deposition reaction of the cathode, there is a problem in that the sulfur concentration of electrodeposited copper is increased and the purity thereof is degraded when an electrolyte contains sulfate radical.

In addition, a water-soluble polymer additive, such as PEG or PVA, has extremely high hydrophilicity and poor ultraviolet absorptivity, quantitative analysis using high performance liquid chromatography (HPLC) is difficult to perform, and the dissolution rate is high. Therefore, it is difficult to accurately control the concentration. Further, dendrites may be easily generated on the surface of electrolytic copper when PEG is used. When PVA is used in order to solve the problem of dendrites, the surface of electrolytic copper becomes smooth, but silver as an impurity is not sufficiently reduced. Moreover, the production method using a surfactant such as PEG described in PTL 2 has a problem in that the amount of sulfur or the like in the electrolytic copper is high and high-purity electrolytic copper is unlikely to be obtained.

The present invention is made to solve the above-described problems of the conventional production methods in production of high-purity copper, and an object thereof is to provide an additive formed of a surfactant including a specific hydrophobic group and a specific hydrophilic group, which causes high-purity copper to be produced in which the concentration of impurities such as sulfur is greatly decreased by suppressing generation of slime using the additive; and a method of producing high-purity copper using the additive.

Solution to Problem

The present invention relates to an additive for high-purity copper electrolytic refining and a method of producing high-purity copper with the following configurations.

[1] An additive for high-purity copper electrolytic refining which is added to a copper electrolyte in electrolytic refining for high-purity copper and is formed of a non-ionic surfactant that includes a hydrophobic group containing an aromatic ring and a hydrophilic group containing a polyoxyalkylene group, in which a dispersion term dD of Hansen solubility parameters satisfies $10 \leq dD \leq 20$, a polarity term dP of the Hansen solubility parameters satisfies $6 \leq dP \leq 9$, and a hydrogen bonding term dH of the Hansen solubility parameters satisfies $9 \leq dH \leq 11$.

[2] The additive for high-purity copper electrolytic refining according to [1], in which the dispersion term dD of the Hansen solubility parameters of the additive satisfies $12 \leq dD \leq 17$, the polarity term dP thereof satisfies $7 \leq dP \leq 9$, and the hydrogen bonding term dH thereof satisfies $9 \leq dH \leq 11$.

[3] A method of producing high-purity copper including: performing electrolysis using a copper electrolyte to which an additive is added which is formed of a non-ionic surfactant that includes a hydrophobic group containing an aromatic ring and a hydrophilic group containing a polyoxyalkylene group and in which a dispersion term dD of the Hansen solubility parameters satisfies $10 \leq dD \leq 20$, a polarity term dP of the Hansen solubility parameters satisfies $6 \leq dP \leq 9$, and a hydrogen bonding term dH of the Hansen solubility parameters satisfies $9 \leq dH \leq 11$.

[4] The method of producing high-purity copper according to [3], in which the concentration of the additive in the copper electrolyte is in a range of 2 to 500 mg/L.

[5] The method of producing high-purity copper according to [3] or [4], in which the copper electrolyte is one of the group consisting of a copper sulfate solution, a copper nitrate solution, and a copper chloride solution.

[6] The method of producing high-purity copper according to [5], in which the copper electrolyte has a copper concentration of 5 to 90 g/L and is one of the group consisting of a copper sulfate solution having a sulfuric acid concentration of 10 to 300 g/L, a copper nitrate solution having a nitric acid concentration of 0.1 to 100 g/L, and a copper chloride solution having a hydrochloric acid concentration of 10 to 300 g/L.

[7] The method of producing high-purity copper according to any one of [3] to [6], in which high-purity copper is produced in which both of the sulfur concentration and the silver concentration are 1 ppm or less.

Advantageous Effects of Invention

Since the additive of the present invention includes a hydrophobic group containing an aromatic ring and a hydrophilic group containing a polyoxyalkylene group, deposition, on a cathode, of silver ions and sulfate ions in an electrolyte is suppressed and the silver concentration and the sulfur concentration of electrolytic copper are greatly decreased.

Further, in the additive of the present invention, when the dispersion term dD of the Hansen solubility parameters satisfies $10 \leq dD \leq 20$, the polarity term dP thereof satisfies $6 \leq dP \leq 9$, and the hydrogen bonding term dH thereof satisfies $9 \leq dH \leq 11$, the anode slime is significantly suppressed. Specifically, for example, according to a preferred aspect of the present invention, the generation rate of the anode slime is suppressed to be 20% or less.

In addition, when a conventional surfactant, for example, PEG in which the dispersion term dD of the Hansen solubility parameters is 3.6, the polarity term dP thereof is 14.3, and the hydrogen bonding term dH thereof is 16.9 is added to a copper sulfur electrolyte, and electrolysis is performed using the copper sulfur electrolyte, the slime generation rate is approximately 30% or greater, which is significantly high. When the amount of slime is large, the slime is absorbed in the surface of the electrolytic copper and this leads to an increase in sulfur content.

The additive of the present invention includes a hydrophobic group containing an aromatic ring and a hydrophilic group of a polyoxyalkylene group and thereby the additive has effects of suppressing deposition, on the cathode, of silver ions and sulfate ions in the electrolyte so that the silver concentration and the sulfur concentration of the electrolytic copper are greatly reduced and suppressing generation of anode slime due to the balance between the hydrophobic group and the hydrophilic group which is suitably maintained. Therefore, the slime is unlikely to be absorbed in the electrolytic copper and thus the sulfur content and the silver content in the electrolytic copper can be greatly reduced by these synergistic effects. In addition, the carbon concentration of the electrolytic copper is also low. Further, since the additive of the present invention does not contain sulfur in the molecular skeleton, the sulfur content in the cathode is extremely low.

Specifically, by using the additive according to the preferred aspect of the present invention, it is possible to obtain high-purity electrolytic copper in which both of the sulfur concentration and the silver concentration are 1 ppm by mass or less.

In the additive of the present invention, dissolution of the anode is moderate and thus anode slime is unlikely to be generated. Therefore, according to the preferred aspect of the present invention, the yield of the cathode can be adjusted to 80% or greater.

DESCRIPTION OF EMBODIMENTS

[Specific Description]

Hereinafter, an embodiment of the present invention (hereinafter, referred to as the present embodiment) will be described in detail.

An additive of the present embodiment is an additive for high-purity copper electrolytic refining which is added to a copper electrolyte in electrolytic refining for high-purity copper and is formed of a non-ionic surfactant that includes a hydrophobic group containing an aromatic ring and a hydrophilic group containing a polyoxyalkylene group, in which a dispersion term dD of the Hansen solubility parameters satisfies $10 \leq dD \leq 20$, a polarity term dP of the Hansen solubility parameters satisfies $6 \leq dP \leq 9$, and a hydrogen bonding term dH of the Hansen solubility parameters satisfies $9 \leq dH \leq 11$.

The additive of the present embodiment is formed of a non-ionic surfactant that includes a hydrophobic group containing an aromatic ring and a hydrophilic group containing a polyoxyalkylene group. The hydrophobic group containing an aromatic ring in the additive is, for example, a phenyl group, a naphthyl group, or the like, and examples thereof include monophenyl, naphthyl, cumyl, alkylphenyl, styrenated phenyl, distyrenated phenyl, and tristyrenated phenyl. The hydrophilic group containing a polyoxyalkylene group in the additive is, for example, a polyoxyethylene group, a polyoxypropylene group, or the like and may include both of a polyoxyethylene group and a polyoxypropylene group.

Specific examples of the compound of the additive of the present embodiment include polyoxyethylene monophenyl ether, polyoxyethylene naphthyl ether, polyoxyethylene styrenated phenyl ether, polyoxyethylene distyrenated phenyl ether, polyoxyethylene tristyrenated phenyl ether, polyoxyethylene cumyl phenyl ether, polyoxypropylene monophenyl ether, polyoxypropylene naphthyl ether, polyoxypropylene styrenated phenyl ether, polyoxypropylene distyrenated phenyl ether, polyoxypropylene tristyrenated phenyl ether, and polyoxypropylene cumyl phenyl ether.

Such an additive of the present embodiment includes the above-described hydrophobic group and the hydrophilic group. Since the additive includes the hydrophobic group and the hydrophilic group, deposition, on a cathode, of silver ions and sulfate ions in an electrolyte is suppressed and the silver concentration and the sulfur concentration of electrolytic copper are greatly decreased.

In the additive of the present embodiment, the balance between the hydrophobic group and the hydrophilic group is suitably maintained, which is shown by the Hansen solubility parameters. Specifically, in the additive described above, the dispersion term dD of the Hansen solubility parameters satisfies $10 \leq dD \leq 20$, the polarity term dP thereof satisfies $6 \leq dP \leq 9$, and the hydrogen bonding term dH thereof satisfies $9 \leq dH \leq 11$.

Typically, the Hansen solubility parameters (HSP) of a liquid have been used as an index of the balance between the hydrophobic group and the hydrophilic group. The HSP is an index indicating the degree of a substance being dissolved in another substance. The solubility parameter δ shows the solubility with the positions of coordinate points in a three-dimensional space using the dispersion term dD, the polarity term dP, and the hydrogen bonding term dH as coordinate axes and can be represented by an equation of $$\delta = (dD^2 + dP^2 + dH^2)^{0.5}.$$

The HSP may show the solubility of a substance with respect to the composition of various solvents and the compatibility can be represented by HSP distance (Ra) Equation, which is the following Equation (1). The compatibility is high when the value of HSPdistance (Ra) is small. HSPdistance (Ra) of two substances A and B can be represented by the following Equation (1). In Equation (1), $dD_A$, $dP_A$, and $dH_A$ represent the dispersion term dD of the substance A, the polarity term dP thereof, and the hydrogen bonding term dH thereof, respectively. Further, $dD_B$, $dP_B$, and $dH_B$ represent the dispersion term dD of the substance B, the polarity term dP thereof, and the hydrogen bonding term dH thereof, respectively.

$$HSP \text{ distance } (Ra) = \{4 \times (dD_A - dD_B)^2 + (dP_A - dP_B)^2 + (dH_A - dH_B)^2\}^{0.5} \quad (1)$$

The Hansen solubility parameters of typical solvents are described in a known literature (Hansen Solubility Parameters: A User's Handbook, Charles Hansen, 2007, second edition, and the like) and the Hansen solubility parameters of a specific solvent can be determined by dissolving the sample in another solvent whose Hansen solubility parameters are determined and measuring the solubility thereof. In addition, the Hansen solubility parameters thereof can be calculated using Hansen solubility parameters in practice (HSPiP) software. Specifically, the dispersion term dD, the polarity term dP, and the hydrogen bonding term dH can be calculated by automatically dividing molecules from the structural formula of the substance using Y-MB tools in HSPiP. In the present specification, the dispersion term dD, the polarity term dP, and the hydrogen bonding term dH of each additive are calculated from the structural formula of the additive using Y-MB tools of HSPiP software.

Moreover, the Hansen solubility parameters (dD, dP, and dH) of the additive used in the present embodiment do not indicate the compatibility between the additive and the electrolyte formed of mineral acid, a copper compound, and water. The solubility parameter specific to the additive indicates the correlation between the additive and the electrodeposition effect based on a new finding that the solubility parameter specific to the additive is correlated with an electrodeposition suppression effect.

Further, as a parameter showing the balance between the hydrophilicity and the lipophilicity of a surfactant, hydrophile-lipophile balance (HLB) is known. HLB represents only the action with respect to water and oil, while HSP represents the solubility of a substance with respect to the composition of various solvents. Accordingly, there is no correlation between HLB and HSP and these two are indices different from each other.

The additive of the present embodiment is a non-ionic surfactant in which the dispersion term dD of the Hansen solubility parameters satisfies 10≤dD≤20, the polarity term dP thereof satisfies 6≤dP≤9, and the hydrogen bonding term dH thereof satisfies 9≤dH≤11. It is preferable that the dispersion term dD of the additive satisfies 12≤dD≤17, the polarity term dP thereof satisfies 7≤dP≤9, and the hydrogen bonding term dH thereof satisfies 9≤dH≤11.

In the additive of the present embodiment, the values of the dispersion term dD, the polarity term dP, and the hydrogen bonding term dH reflect the balance between the hydrophilic group and the hydrophobic group and the molecular weights of these functional groups. In addition, the above-described ranges of the values of the dispersion term dD, the polarity term dP, and the hydrogen bonding term dH indicate the optimum ranges for electrolytic deposition of high-purity copper with the smooth surface of electrolytic copper and extremely small amount of impurities such as sulfur, in which generation of anode slime is suppressed.

Specifically, when the dispersion term dD of the Hansen solubility parameters of the additive satisfies 10≤dD≤20, the polarity term dP thereof satisfies 6≤dP≤9, and the hydrogen bonding term dH thereof satisfies 9≤dH≤11, generation of anode slime is greatly suppressed. For example, the generation rate of the anode slime is suppressed to 20% or less.

In addition, when the amount of the hydrophilic group of the additive is excessively large, the effect of the hydrophilic group on suppressing deposition on the cathode is excessively strong and thus the deposition surface becomes rough. Further, when the amount of the hydrophobic group is excessively large, oiliness becomes high so that the adsorptivity is increased, the effect of the hydrophobic group on suppressing deposition becomes extremely strong and thus the deposition state deteriorates, and the surfactant is unlikely to be dissolved in the electrolyte.

Specifically, when the dispersion term dD of the additive is greater than 20, the polarity term dP thereof is less than 6, and the hydrogen bonding term dH is less than 9, the solubility of the additive in the copper electrolyte is significantly degraded. Further, when the dispersion term dD of the additive is less than 10, the polarity term dP thereof is greater than 9, and the hydrogen bonding term dH is greater than 11, the effect of the additive on suppressing dissolution of the anode is extremely strong so that the deposition surface becomes rough and the anode slime is increased.

The additive of the present embodiment is added to the copper electrolyte in electrolytic refining for high-purity copper and then used. The concentration of the additive is preferably in a range of 2 to 500 mg/L and more preferably in a range of 10 to 300 mg/L. When the concentration of the additive is less than 2 mg/L, the smoothness of the surface of the electrolytic copper is degraded due to the poor effect obtained from the addition, sulfur in the electrolyte adheres to the surface of the electrolytic copper and is easily absorbed therein, and thus the sulfur concentration in the electrolytic copper is increased. On the other hand, when the concentration of the additive is greater than 500 mg/L, the amount of slime to be generated is increased due to strong adhesion of the additive to the surface of the anode, the slime and an excessive amount of additive are absorbed in the electrolytic copper on the cathode, and thus the sulfur concentration and the silver concentration in the electrolytic copper are increased.

The copper electrolyte to which the additive of the present embodiment is to be added, is a copper compound solution of mineral acid such as a copper sulfate solution, a copper nitrate solution, or a copper chloride solution.

In a case where a copper sulfate solution is used as a copper electrolyte, the sulfuric acid concentration is preferably in a range of 10 to 300 g/L. When the sulfuric acid concentration is less than 10 g/L, copper hydroxide is generated in electrolytic copper and the deposition state is degraded. On the other hand, when the sulfuric acid concentration is greater than 300 g/L, the amount of sulfuric acid to be absorbed in the electrolytic copper is increased and the sulfur concentration is increased. Further, the sulfuric acid concentration is more preferably in a range of 20 to 100 g/L. In a case where a copper nitrate solution is used as the copper electrolyte, the concentration of nitric acid is preferably in a range of 0.1 to 100 g/L and more preferably in a range of 1 to 50 g/L. In a case where a copper chloride solution is used as the copper electrolyte, the hydrochloric acid concentration is preferably in a range of 10 to 300 g/L and more preferably in a range of 15 to 75 g/L.

Even when the copper electrolyte is any one of a copper sulfate solution, a copper nitrate solution, and a copper chloride solution, the copper concentration of the electrolyte is preferably in a range of 5 to 90 g/L (the copper sulfate pentahydrate concentration is preferably in a range of 20 to 350 g/L, the copper nitrate trihydrate concentration is preferably in a range of 19 to 342 g/L, and the copper chloride dihydrate concentration is preferably in a range of 13 to 241 g/L). When the copper concentration is less than 5 g/L, since the electrolytic copper is deposited in a powder state, the purity thereof is degraded. On the other hand, when the copper concentration is greater than 90 g/L, the electrolyte is easily absorbed in the electrolytic copper, and thus the purity thereof is degraded. Further, the copper concentration of the copper electrolyte is more preferably in a range of 40 to 80 g/L.

In a case where the electrolyte is a copper sulfate solution or a copper nitrate solution, the chloride ion concentration of the electrolyte is preferably 200 mg/L or less. When the chloride ion concentration is greater than 200 mg/L, a chloride is easily absorbed in the electrolytic copper, and thus the purity of the electrolytic copper is degraded. Further, it is preferable that the lower limit of the chloride ion concentration is set to 1 mg/L and more preferable that the chloride ion concentration is set to be in a range of 10 to 100 mg/L.

The additive of the present embodiment is formed of a non-ionic surfactant that includes a hydrophilic group such as a polyoxyethylene group and a hydrophobic group such as a phenyl group or a naphthyl group and has strong ultraviolet absorptivity and hydrophobicity. Therefore, quantitative analysis using high performance liquid chromatography (HPLC) can be performed. Here, the copper electrolytic refining may be performed in a manner in which the concentration of the additive is measured by HPLC and a decreased amount of the additive is replenished such that the concentration of the additive is maintained to be preferably in a range of 2 to 500 mg/L and more preferably in a range of 10 to 300 mg/L.

EXAMPLES

Examples and comparative examples of the present invention will be described below. The sulfur concentration and the silver concentration in a central portion of electrolytic copper which was subjected to electrolytic refining were measured by glow discharge mass spectrometry (GD-MS).

The slime generation rate was acquired by the following equation.

Slime generation rate (%)=100−(weight of deposited electrolytic copper)/(dissolution amount of anode (weight))×100

The dD, dP, and dH of the Hansen solubility parameters of additives (A to C) were calculated by inputting structural formulae of the additives in the SMILES format using the equation of Hansen solubility parameters in practice (HSPiP) software. Further, in each example, the dD, dP, and dH were changed by changing the added number of moles of a polyoxyethylene group as a hydrophilic group. For example, in polyoxyethylene dodecyl ether $CH_3(CH_2)_{11}O(C_2H_4O)_nH$ (n represents an added number of moles), the dD, dP, and dH are respectively 13.9, 6.3, and 9.4 in a case where n is 9, and the dD, dP, and dH are respectively 10.0, 9.0, and 12.5 in a case where n is 20.

Regarding the smoothness, samples which did not have dendrites (dendron) being generated or powdery deposition were evaluated as A, samples which had a slight amount of dendrites being generated or powdery deposition were evaluated as B, and samples which had a large amount of dendrites being generated or powdery deposition were evaluated as C. Specifically, samples in which 2 to 5 pieces of dendrites per 10 $cm^2$ were seen were evaluated as B. Further, samples in which 6 or more pieces of dendrites per 10 $cm^2$ were seen or samples in which powdery deposition was seen were evaluated as C. Other samples which were determined not to have dendrites benign generated or powdery deposition were evaluated as A.

Example 1

A copper sulfate solution with a sulfuric acid concentration of 100 g/L, a copper sulfate pentahydrate concentration of 200 g/L, and a chloride ion concentration of 100 mg/L was used as the electrolyte and additives A, B, and C were used. 30 mg/L of the additives A, B, and C were added to the electrolyte. As an anode, electrolytic copper having a sulfur concentration of 5 ppm by mass and a silver concentration of 8 ppm by mass was used. The current density was set to 200 $A/m^2$ and electrolysis was performed at a bath temperature of 30° C. The concentration of the additive was measured by HPLC using an ODS column every 12 hours and the decreased amount of the additive was replenished such that the concentration of the additive was maintained at 30 mg/L, while performing electrolytic refining on electrolytic copper. The results are shown in Table 1.

The used additives A, B, and C are as follows.
Additive A: polyoxyethylene monophenyl ether
Additive B: polyoxyethylene naphthyl ether
Additive C: polyoxyethylene distyrenated phenyl ether As shown in Table 1, in a case where the dispersion term dD satisfied 12≤dD≤17, the polarity term dP satisfied 7≤dP≤9, and the hydrogen bonding term dH satisfied 9≤dH≤11, electrolytic copper with a smooth surface which had a slime generation rate of 20% or less, a sulfur concentration of approximately 0.5 ppm by mass or less, and a silver concentration of 1.0 ppm by mass or less was obtained (No. 1 to No. 6). Accordingly, as an additive, an additive in which the dispersion term dD satisfies 12≤dD≤17, the polarity term dP satisfies 7≤dP≤9, and the hydrogen bonding term dH satisfies 9≤d≤11 is preferable.

TABLE 1

| No | Electrolyte | Additive Type | dD | dP | dH | Slime generation rate % | Electrolytic copper (unit of numerical value: ppm) S | Ag | Smoothness |
|---|---|---|---|---|---|---|---|---|---|
| 1 | Copper | A | 13.8 | 8.0 | 9.7 | 13 | 0.23 | 0.6 | A |
| 2 | sulfate | | 16.2 | 7.2 | 9.5 | 11 | 0.31 | 0.8 | A |
| 3 | Copper | B | 16.7 | 7.3 | 9.5 | 14 | 0.44 | 0.7 | A |
| 4 | sulfate | | 12.4 | 9.0 | 11.0 | 18 | 0.36 | 1.0 | A |
| 5 | Copper | C | 13.2 | 7.0 | 9.0 | 17 | 0.46 | 0.7 | A |
| 6 | sulfate | | 12.3 | 7.5 | 9.6 | 20 | 0.50 | 0.9 | A |

TABLE 1-continued

| No | Electrolyte | Additive Type | dD | dP | dH | Slime generation rate % | Electrolytic copper (unit of numerical value: ppm) S | Ag | Smoothness |
|---|---|---|---|---|---|---|---|---|---|
| 7 | Copper sulfate | B | 8.4 | 11.1 | 13.9 | 32 | 3.12 | 2.3 | C |

(Note)
No. 1 to No. 6 represent samples of the example and No. 7 represents a sample for comparison.

Example 2

Electrolytic refining was performed on electrolytic copper using the additives A, B, and C having the Hansen solubility parameters dD, dP, and dH shown in Table 2 under the same conditions as in Example 1. The results are shown in Table 2. As shown in Table 2, in the dD values, dP values, and dH values of the additives A, B, and C, the dD value was high in a case of the sample No. 10, the dD value was high and the dP value was low in a case of the sample No. 11, and the dD value was low and the silver concentration and the sulfur concentration were both approximately 1 ppm by mass or less in a case of the sample No. 12, compared to the sample Nos. 1 to 6 of Example 1. In this manner, it was confirmed that high-purity electrolytic copper having a low sulfur concentration was obtained in a case where the dispersion term dD of the Hansen solubility parameters satisfied $12 \leq dD \leq 17$, the polarity term dP thereof satisfied $7 \leq dP \leq 9$, and the hydrogen bonding term dH thereof satisfied $9 \leq dH \leq 11$.

TABLE 2

| No | Electrolyte | Additive Type | dD | dP | dH | Slime generation rate % | Electrolytic copper (unit of numerical value: ppm) S | Ag | Smoothness |
|---|---|---|---|---|---|---|---|---|---|
| 10 | Copper sulfate | A | 17.3 | 7 | 10.2 | 17 | 0.85 | 0.8 | A |
| 11 | Copper sulfate | B | 18.4 | 6.9 | 10.0 | 19 | 0.92 | 0.9 | A |
| 12 | Copper sulfate | C | 10.5 | 8.4 | 10.9 | 19 | 0.96 | 0.9 | A |

(Note)
No. 10 to No. 12 represent samples of the example.

Example 3

Electrolytic refining was performed on electrolytic copper using the additives A, B, and C shown in Table 3 under the same conditions as in Example 1 except that a copper nitrate solution having a nitric acid concentration of 5 g/L, a copper nitrate trihydrate concentration of 200 g/L, and a chloride ion concentration of 100 mg/L was used as an electrolyte. The results are shown in Table 3.

As shown in Table 3, in an additive in which the dispersion term dD of the Hansen solubility parameters satisfied $12 \leq dD \leq 17$, the polarity term dP thereof satisfied $7 \leq dP \leq 9$, and the hydrogen bonding term dH thereof satisfied $9 \leq d \leq 11$, even in a case where the copper nitrate solution was used as the electrolyte, the slime generation rate was low, both of the sulfur content and the silver content of electrolytic copper were 1 ppm by mass or less, which was small, and the smoothness of the surface of the electrolytic copper was excellent.

TABLE 3

| No | Electrolyte | Additive Type | dD | dP | dH | Slime generation rate % | Electrolytic copper (unit of numerical value: ppm) S | Ag | Smoothness |
|---|---|---|---|---|---|---|---|---|---|
| 20 | Copper nitrate | A | 13.8 | 8.0 | 9.7 | 16 | 0.08 | 0.7 | A |
| 21 | | | 16.2 | 7.2 | 9.5 | 15 | 0.11 | 0.8 | A |
| 22 | Copper nitrate | B | 16.7 | 7.3 | 9.5 | 18 | 0.10 | 0.9 | A |
| 23 | | | 12.4 | 9.0 | 11.0 | 19 | 0.09 | 1.0 | A |

TABLE 3-continued

| No | Electrolyte | Additive Type | dD | dP | dH | Slime generation rate % | Electrolytic copper (unit of numerical value: ppm) S | Ag | Smoothness |
|---|---|---|---|---|---|---|---|---|---|
| 24 | Copper | C | 13.2 | 7.0 | 9.0 | 19 | 0.21 | 0.9 | A |
| 25 | nitrate | | 12.3 | 7.5 | 9.6 | 20 | 0.23 | 0.9 | A |

(Note)
No. 20 to No. 25 represent samples of the example.

Example 4

Electrolytic refining was performed on electrolytic copper in the same manner as in Example 1 except that the amount of the additive A was adjusted so as to obtain the concentration shown in Table 4 (sample Nos. 30 to 35). The results are shown in Table 4. Further, electrolytic refining was performed on electrolytic copper in the same manner as in Example 3 except that the amount of the additive B was adjusted so as to obtain the concentration shown in Table 4 (sample Nos. 36 to 41). The results are shown in Table 4.

As shown in Table 4, the sample Nos. 31 to 34, and 37 to 40 in which the concentrations of the additives were in a range of 2 to 500 mg/L had less impurities and excellent smoothness of the surface of electrolytic copper compared to the sample Nos. 30, 35, 36, and 41 in which the concentrations of the additives were 0.1 mg/L or 800 mg/L. Accordingly, the concentrations of the additives A and B are preferably in a range of 2 to 500 mg/L.

Electrolytic refining was performed on electrolytic copper in the same manner as in Example 3 except that the nitric acid concentration and the copper concentration were adjusted as shown in Table 5 using a copper nitrate solution as an electrolyte and the additive B was added to the electrolyte such that the concentration thereof became 30 mg/L (sample Nos. 55 to 59). The results are shown in Table 5.

As shown in Table 5, the sample Nos. 51 to 53 in which the sulfuric acid concentrations were in a range of 10 to 300 mg/L and the copper concentrations were in a range of 5 to 90 g/L had less impurities and excellent smoothness of the surface of electrolytic copper. Further, the sample Nos. 56 to 58 in which the nitric acid concentrations were in a range of 0.1 to 100 mg/L and the copper concentrations were in a range of 5 to 90 g/L had less impurities and excellent smoothness of the surface of electrolytic copper. On the other hand, the sample Nos. 50, 54, 55, and 59 in which the sulfuric concentrations or the nitric acid concentrations and

TABLE 4

| No | Electrolyte | Additive Type, dD, dP, dH | Concentration (mg/L) | Slime generation rate % | Electrolytic copper (unit of numerical value: ppm) S | Ag | Smoothness |
|---|---|---|---|---|---|---|---|
| 30 | Copper | A | 0.1 | 11 | 4.56 | 2.9 | B |
| 31 | sulfate | dD: 13.8 | 2 | 11 | 0.31 | 0.6 | A |
| 32 | | dP: 8.0 | 50 | 14 | 0.23 | 0.6 | A |
| 33 | | dH: 9.7 | 300 | 18 | 0.56 | 0.7 | A |
| 34 | | | 500 | 19 | 0.95 | 0.7 | B |
| 35 | | | 800 | 27 | 2.81 | 2.3 | C |
| 36 | Copper | B | 0.1 | 12 | 0.36 | 3.5 | B |
| 37 | nitrate | dD: 16.7 | 2 | 13 | 0.08 | 0.8 | A |
| 38 | | dP: 7.3 | 50 | 15 | 0.10 | 0.9 | A |
| 39 | | dH: 9.5 | 300 | 15 | 0.11 | 0.9 | A |
| 40 | | | 500 | 20 | 0.29 | 1.0 | A |
| 41 | | | 800 | 31 | 0.31 | 3.1 | C |

(Note)
The sample Nos. 31 to 34 are within the preferable ranges and the sample Nos. 37 to 40 are within the preferable ranges.

Example 5

Electrolytic refining was performed on electrolytic copper in the same manner as in Example 1 except that the sulfuric acid concentration and the copper concentration were adjusted as shown in Table 5 using a copper sulfate solution as an electrolyte and the additive A was added to the electrolyte such that the concentration thereof became 30 mg/L (sample Nos. 50 to 54). The results are shown in Table 5.

the copper concentrations were out of the above-described ranges had rough surfaces of the electrodeposited copper and/or the slime generation rates were large. Accordingly, it is preferable that the sulfuric acid solution used as an electrolyte has a sulfuric acid concentration of 10 to 300 g/L and a copper concentration of 5 to 90 g/L and the copper nitrate solution used as an electrolyte has a nitric acid concentration of 0.1 to 100 g/L and a copper concentration of 5 to 90 g/L.

TABLE 5

| No | Electrolyte Type | Acid concentration | Copper concentration | Type and concentration of additive | Slime generation rate % | Electrolytic copper (unit of numerical value: ppm) S | Ag | Smoothness |
|---|---|---|---|---|---|---|---|---|
| 50 | Copper sulfate | 400 | 0.1 | A | 13 | 5.29 | 3.8 | C |
| 51 | | 300 | 5 | dD: 13.8 | 13 | 0.81 | 0.8 | B |
| 52 | | 50 | 50 | dP: 8.0 | 14 | 0.21 | 0.6 | A |
| 53 | | 10 | 90 | dH: 9.7 | 19 | 0.31 | 0.6 | A |
| 54 | | 1 | 100 | 30 mg/L | 33 | 4.81 | 1.5 | C |
| 55 | Copper nitrate | 120 | 0.1 | B | 16 | 0.21 | 4.2 | C |
| 56 | | 100 | 5 | dD: 16.7 | 14 | 0.10 | 0.9 | B |
| 57 | | 10 | 50 | dP: 7.3 | 15 | 0.08 | 0.8 | A |
| 58 | | 0.1 | 90 | dH: 9.5 | 18 | 0.11 | 0.8 | A |
| 59 | | 0.01 | 100 | 30 mg/L | 49 | 0.18 | 1.5 | C |

(Note)
The sample Nos. 51 to 53 are within the preferable ranges and the sample Nos. 56 to 58 are within the preferable ranges.

INDUSTRIAL APPLICABILITY

According to the additive for high-purity copper electrolytic refining and the method of producing high-purity copper using the additive of the present invention, it is possible to produce high-purity copper in which the concentration of impurities such as sulfur or silver is greatly reduced while suppressing generation of slime.

The invention claimed is:

1. An additive for high-purity copper electrolytic refining which is added to a copper electrolyte in electrolytic refining for high-purity copper and is formed of a non-ionic surfactant that includes a hydrophobic group containing an aromatic ring and a hydrophilic group containing a polyoxyalkylene group, wherein
 a dispersion term dD of Hansen solubility parameters satisfies 10≤dD≤20,
 a polarity term dP of the Hansen solubility parameters satisfies 6≤dP≤9, and
 a hydrogen bonding term dH of the Hansen solubility parameters satisfies 9≤dH≤11.

2. The additive for high-purity copper electrolytic refining according to claim 1, wherein
 the dispersion term dD of the Hansen solubility parameters of the additive satisfies 12≤dD≤17,
 the polarity term dP thereof satisfies 7≤dP≤9, and
 the hydrogen bonding term dH thereof satisfies 9≤dH≤11.

3. A method of producing high-purity copper comprising:
 performing electrolysis using a copper electrolyte to which an additive is added which is formed of a non-ionic surfactant that includes a hydrophobic group containing an aromatic ring and a hydrophilic group containing a polyoxyalkylene group and in which a dispersion term dD of the Hansen solubility parameters satisfies 10≤dD≤20, a polarity term dP of the Hansen solubility parameters satisfies 6≤dP≤9, and a hydrogen bonding term dH of the Hansen solubility parameters satisfies 9≤dH≤11.

4. The method of producing high-purity copper according to claim 3, wherein
 a concentration of the additive in the copper electrolyte is in a range of 2 to 500 mg/L.

5. The method of producing high-purity copper according to claim 4, wherein
 the copper electrolyte is one of the group consisting of a copper sulfate solution, a copper nitrate solution, and a copper chloride solution.

6. The method of producing high-purity copper according to claim 5, wherein
 the copper electrolyte has a copper concentration of 5 to 90 g/L and is one of the group consisting of a copper sulfate solution having a sulfuric acid concentration of 10 to 300 g/L, a copper nitrate solution having a nitric acid concentration of 0.1 to 100 g/L, and a copper chloride solution having a hydrochloric acid concentration of 10 to 300 g/L.

7. The method of producing high-purity copper according to claim 6, wherein
 high-purity copper is produced in which both of the sulfur concentration and the silver concentration are 1 ppm or less.

8. The method of producing high-purity copper according to claim 5, wherein
 high-purity copper is produced in which both of the sulfur concentration and the silver concentration are 1 ppm or less.

9. The method of producing high-purity copper according to claim 4, wherein
 high-purity copper is produced in which both of the sulfur concentration and the silver concentration are 1 ppm or less.

10. The method of producing high-purity copper according to claim 3, wherein
 the copper electrolyte is one of the group consisting of a copper sulfate solution, a copper nitrate solution, and a copper chloride solution.

11. The method of producing high-purity copper according to claim 10, wherein
 the copper electrolyte has a copper concentration of 5 to 90 g/L and is one of the group consisting of a copper sulfate solution having a sulfuric acid concentration of 10 to 300 g/L, a copper nitrate solution having a nitric acid concentration of 0.1 to 100 g/L, and a copper chloride solution having a hydrochloric acid concentration of 10 to 300 g/L.

12. The method of producing high-purity copper according to claim 11, wherein
 high-purity copper is produced in which both of the sulfur concentration and the silver concentration are 1 ppm or less.

13. The method of producing high-purity copper according to claim 10, wherein
 high-purity copper is produced in which both of the sulfur concentration and the silver concentration are 1 ppm or less.

14. The method of producing high-purity copper according to claim 3, wherein
 high-purity copper is produced in which both of the sulfur concentration and the silver concentration are 1 ppm or less.

* * * * *